United States Patent
Bourgeois et al.

(10) Patent No.: US 10,710,414 B2
(45) Date of Patent: Jul. 14, 2020

(54) TIRE COMPRISING AN IMPROVED TREAD

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Frédéric Bourgeois, Clermont-Ferrand (FR); François-Xavier Bruneau, Clermont-Ferrand (FR); Patrice Fraysse, Clermont-Ferrand (FR); Emmanuel Igier, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1020 days.

(21) Appl. No.: 14/897,457

(22) PCT Filed: Jun. 5, 2014

(86) PCT No.: PCT/EP2014/061650
§ 371 (c)(1),
(2) Date: Dec. 10, 2015

(87) PCT Pub. No.: WO2014/198616
PCT Pub. Date: Dec. 18, 2014

(65) Prior Publication Data
US 2016/0137001 A1 May 19, 2016

(30) Foreign Application Priority Data

Jun. 10, 2013 (FR) ..................... 13 55311
Sep. 2, 2013 (FR) ..................... 13 58374

(51) Int. Cl.
*B60C 11/00* (2006.01)
*B60C 11/03* (2006.01)
*B60C 11/04* (2006.01)

(52) U.S. Cl.
CPC ...... *B60C 11/0008* (2013.01); *B60C 11/0041* (2013.01); *B60C 11/0066* (2013.01);
(Continued)

(58) Field of Classification Search
CPC ............. B60C 11/0041; B60C 11/0058; B60C 11/0025; B60C 2011/0025
See application file for complete search history.

(56) References Cited

U.S. PATENT DOCUMENTS 2,268,344 A * 12/1941 Shesterkin .......... B60C 11/0309
152/209.18
5,883,179 A * 3/1999 Kawazoe ................. C08K 9/02
524/492

(Continued)

FOREIGN PATENT DOCUMENTS

EP        864446 A1 *  9/1998
EP      1 308 319    11/2001
(Continued)

OTHER PUBLICATIONS

Machine translation for Japan 2008-044530 (Year: 2018).*
(Continued)

*Primary Examiner* — Steven D Maki
(74) *Attorney, Agent, or Firm* — Cozen O'Connor

(57) ABSTRACT

Tire having a predetermined direction of mounting on a vehicle. The tire tread (40) comprises a central rib (411-413) and two side ribs (421, 422), separated by circumferential grooves (141-144). The side ribs are made from a first rubber composition less than 50% filled with black. The central rib comprises a portion (4111, 4121) made from a second rubber composition more than 50% filled with black, the axial width (LP) of said portion being greater than or equal to 20% of the axial width LC of the central rib. The first rubber composition has a tan δ0 value which is greater than the tan
(Continued)

$\delta 0$ value of the second rubber composition, where tan $\delta 0$ denotes the tan $\delta$ value measured at a temperature of 0° C. and under a stress of 0.7 mPa.

7 Claims, 4 Drawing Sheets

(52) U.S. Cl.
CPC .......... *B60C 11/0302* (2013.01); *B60C 11/04* (2013.01); *B60C 2011/0025* (2013.01); *B60C 2011/0341* (2013.01)

(56) References Cited

U.S. PATENT DOCUMENTS

| | | | |
|---|---|---|---|
| 2004/0112490 A1* | 6/2004 | Sandstrom | B60C 11/18 152/152.1 |
| 2006/0116457 A1 | 6/2006 | Cambon et al. | |

FOREIGN PATENT DOCUMENTS

| | | |
|---|---|---|
| EP | 2537685 | 12/2012 |
| EP | 2 565 056 | 3/2013 |
| JP | H 03 25003 | 2/1991 |
| JP | 2005-186841 A * | 7/2005 |
| JP | 2008-044530 A * | 2/2008 |
| JP | 2012-162194 A * | 8/2012 |
| WO | WO 2011/076680 | 6/2011 |
| WO | WO-2011/076680 A1 * | 6/2011 |
| WO | WO 2012/175444 | 12/2012 |

OTHER PUBLICATIONS

Machine translation for Japan 2005-186841 (Year: 2019).*
Partial translation for Japan 2005-186841 (Year: 2019).*
Machine translation for Japan 2012-162194 (Year: 2019).*

\* cited by examiner

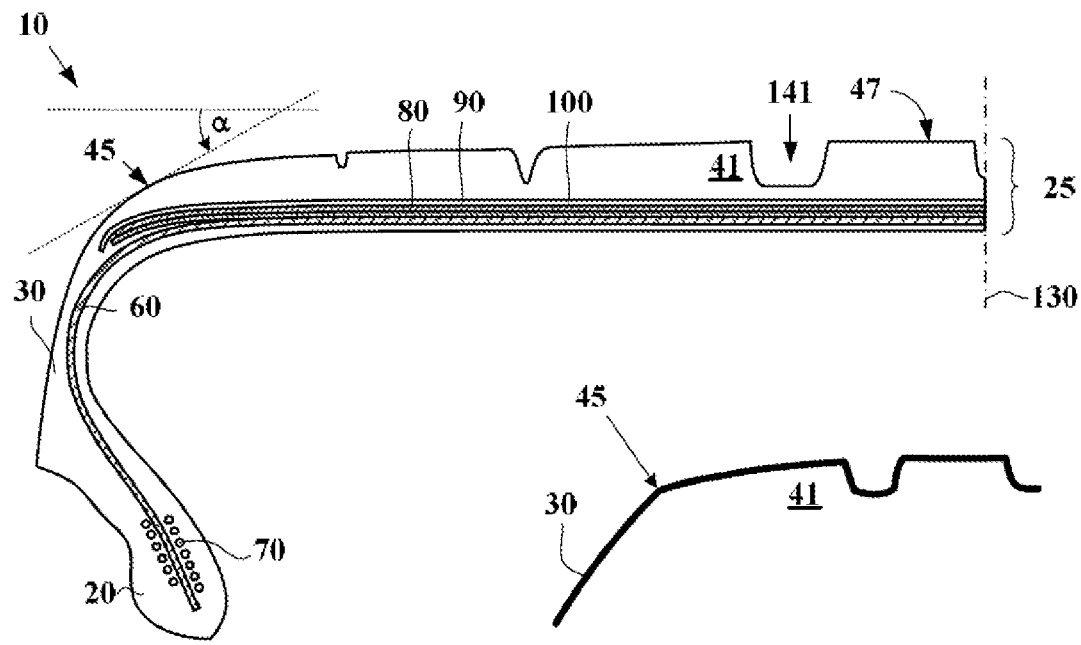
FIG. 3
(PRIOR ART)
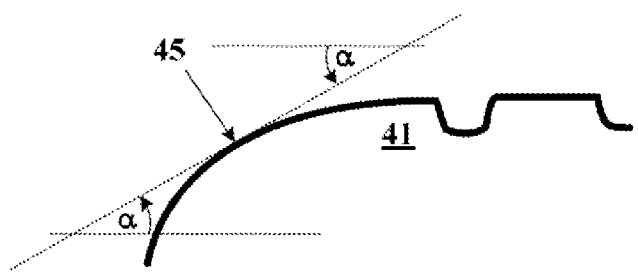
FIG. 4
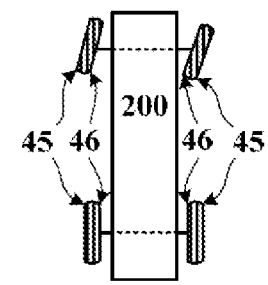
FIG. 5
FIG. 6
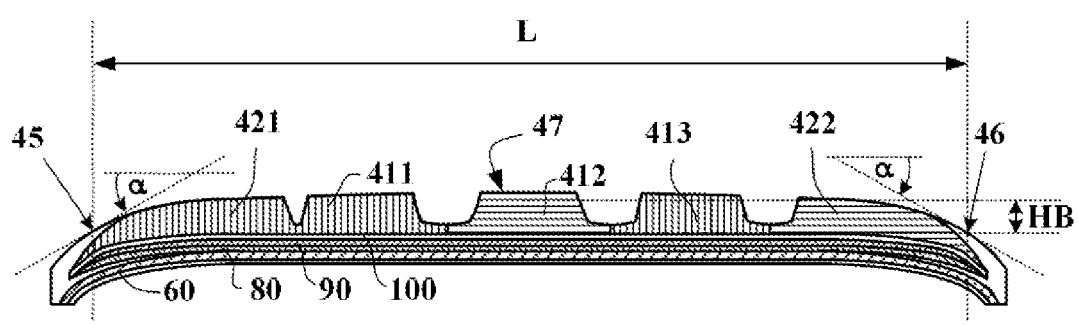
FIG. 7   (PRIOR ART)

TIRE COMPRISING AN IMPROVED TREAD

RELATED APPLICATIONS

This is a U.S. National stage of International application No. PCT/EP2014/061650 filed on Jun. 5, 2014.

This patent application claims the priority of French application nos. 1355311 filed Jun. 10, 2013 and 1358374 filed Sep. 9, 2013, the disclosure content of both of which are hereby incorporated by reference.

FIELD OF THE INVENTION

The present invention relates to tires for passenger vehicles. It relates more particularly to tires suited to sporty road driving.

BACKGROUND

The grip that tires have on the ground on which they are running is one of the most important features from the point of view of the safety of the driver of a vehicle fitted with tires. It is also of key importance in determining the performance of the vehicle in sporty road driving: if its tires lose their ability to steer as a result of a lack of grip, the vehicle can no longer be steered.

Of course, a vehicle, even if intended for sporty use, has to be driven in variable weather conditions. It is therefore known practice for the tire to be provided with means that provide good grip on dry ground and on wet ground. In particular, it is possible to tailor at least part of the tread pattern to use on wet ground, for example by providing recesses able to drain away and/or to store water, or by increasing the number of tread pattern edge features able to cut through the film of water formed between the tread and the ground. It is also possible to vary the materials of which the tread is made, using rubber compositions more particularly suited to use on wet ground and/or on dry ground. A tread comprising the two types of rubber composition is able to achieve good grip under all circumstances. An example of such a tire is given in document EP 1 308 319.

Under sporty road driving conditions, the tires of a vehicle experience substantial transverse loadings when the vehicle fitted with the tires is cornering. During the corner, these transverse loadings cause, on the contact patch where each tire makes contact with the ground on which it is running, deformation resulting in a somewhat trapezoidal shape: the side of the contact patch furthest away from the centre of the bend lengthens, while the side of the contact patch closest to the centre of the bend shortens.

The "side of the contact patch furthest away from the centre of the bend" is the side via which the elements of the tread come into contact with the ground in the direction of the rate of drift of the centre of the wheel on which the tire is mounted. For this reason, it is sometimes known as (transverse) leading edge. The opposite side, that is to say the "side of the contact patch closest to the centre of the bend" is sometimes known as the (transverse) trailing edge.

This "trapezoidal" deformation alters both the load borne by the various ribs of the tread and the contribution that each makes to the transverse force developed by the tire. For a given load that one of the tires of the vehicle has to bear at a given cornering speed, the ribs that have become lengthened bear a greater share of the total load borne by the tire. The ribs which have shortened bear a correspondingly lower proportion of the total load borne by the tire. For a given transverse force, delivered by one of the tires at a given cornering speed, what this means is that the most heavily loaded ribs (which in general means those on the side furthest away from the centre of the bend) are those which also make the greatest contribution to the total transverse force.

Rubber compositions suited to use on wet ground are generally more fragile with respect to the very high thermal and mechanical stresses generated in the contact patch of a tire at severe cornering speed on a dry road surface. If the tread of the tire is provided with portions made of a rubber composition with better grip on dry ground and with portions made of a rubber composition with better grip on wet ground, then it is preferable to ensure that the rubber composition that has better grip on dry ground is placed on the side of the contact patch that is furthest away from the centre of the bend. Thus, even if the contact patch becomes trapezoidal, the tire will maintain good grip on dry ground, that is to say a good ability to develop a high transverse force. Further, because the ground contact pressures are higher on this same side of the contact patch (which is the furthest away from the centre of the bend), the drainage of the water with which the road surface is wetted is generally rather satisfactory in this part of the contact patch. Consequently, this region of the tread is particularly suited to the use of a rubber composition with better grip on dry ground. In other words, the tire, in this region, runs as if it were running on dry ground. There is therefore no need to make this part of the tread from a rubber composition that has better grip on wet ground and of which the performance on dry ground is inferior to that of a rubber composition that has better grip on dry ground. The "Pilot Sport 2" tire sold by Michelin is an example of a tire in the tread of which the rubber compositions are arranged in this manner.

In spite of the good performance offered by this tire in terms of grip, there is still an increasing need to improve the compromise between grip on dry ground and grip on wet ground of tires, and more particularly of tires designed for sporty road driving. This is why the applicant proposed, in its patent applications WO 2011/076680 A1 and WO 2012/175444 A1, to divide the tread into several axial zones and to distribute the rubber compositions with better grip on wet ground and the rubber compositions with better grip on dry ground shrewdly over these zones. Although these solutions made it possible to obtain a better compromise on dry ground and on wet ground, they are not however optimal in terms of grip on wet ground.

SUMMARY OF THE INVENTION

One of the objectives of the present invention is therefore to provide a tire for sporty road driving that has a better grip on wet ground while maintaining an excellent grip on dry ground.

This objective is achieved using a tire intended to be mounted on a mounting rim of a wheel of a vehicle and having a predetermined direction of mounting on the vehicle, comprising a tread that extends between an outer axial edge and an inner axial edge, the inner axial edge being the edge intended to be mounted on the body side of the vehicle when the tire is mounted on the vehicle in said predetermined direction of mounting. The tread comprises at least one central rib and two side ribs, the side ribs being positioned on either side of said at least one central rib, the ribs being separated by circumferential grooves each comprising two side walls. Each central rib is delimited axially by an outer border and by an inner border, each border being formed by a side wall of a circumferential groove, the inner border being axially closer to the inner axial edge of the tread than the outer border, the axial distance, over the tread surface in the new state (i.e. not worn), between the outer border and the inner border defining the axial width LC of the central rib. The side ribs are made from at least one first rubber composition, this at least one first rubber composition comprising at least one elastomer and at least one reinforcing filler, optionally including a carbon black, the carbon black representing a percentage of greater than or equal to 0% and less than or equal to 50% of the weight of all of the reinforcing filler; this rubber composition makes it possible to obtain good braking performance on wet ground. At least one of the central ribs comprises a portion made from at least one second rubber composition, this at least one second rubber composition comprising at least one elastomer and at least one reinforcing filler comprising a carbon black, the carbon black representing a percentage of greater than or equal to 50% and less than or equal to 100% of the weight of all of the reinforcing filler, said portion extending from the outer border of the central rib axially in the direction of the inner axial edge of the tread (i.e. axially inwards if the outer border of the central rib is axially on the same side relative to the median plane of the tire as the outer axial edge of the tread, and axially outwards if the outer border of the central rib is axially on the same side relative to the median plane of the tire as the inner axial edge of the tread), the axial width of said portion being, over the entire radial depth of the central rib, greater than or equal to 20% of the axial width LC of the central rib. Said at least one first rubber composition has a tan $\delta 0$ value which is greater than the tan $\delta 0$ value of said at least one second rubber composition, where tan $\delta 0$ denotes the tan $\delta$ value measured at a temperature of 0° C. and under a stress of 0.7 mPa.

Preferably, said percentage of carbon black by weight of all of the reinforcing filler is not the same for said first rubber composition and said second rubber composition; the difference between the percentage of carbon black of said first rubber composition and the percentage of carbon black of said second rubber composition is preferably greater than 5 points and more preferably still greater than 10 points.

This tire makes it possible to obtain a substantial improvement in grip on wet ground while retaining its grip on dry ground.

According to a first advantageous embodiment, the tire comprises a plurality of central ribs and at least two of the central ribs comprise a portion made from said at least one second rubber composition, said portion extending from the outer border of the central rib axially in the direction of the inner axial edge of the tread, the axial width of said portion being, over the entire radial depth of the central rib, greater than or equal to 20% of the axial width LC of the central rib. The fact of providing a plurality of central ribs makes it possible in particular to improve the behaviour of the tire on wet ground, since the increase in the number of grooves allows better discharging of the water on the road.

According to a second advantageous embodiment, the tire comprises a plurality of central ribs and all the central ribs comprise a portion made from said at least one second rubber composition, said portion extending from the outer border of the central rib axially in the direction of the inner axial edge of the tread, the axial width of said portion being, over the entire radial depth of the central rib, greater than or equal to 20% of the axial width LC of the central rib.

According to a third advantageous embodiment, all central ribs are composed entirely of said at least one second rubber composition. This embodiment is distinguished in particular by its ease of industrial processability.

According to a fourth advantageous embodiment, the axial width of said portion is, over the entire radial depth of the central rib, less than or equal to 60% of the axial width LC of the central rib, the remainder of said at least one central rib being composed of at least one third rubber composition, this at least one third rubber composition comprising at least one elastomer and at least one reinforcing filler, optionally including a carbon black, the carbon black representing a percentage of greater than or equal to 0% and less than or equal to 50% of the weight of all of the reinforcing filler, said at least one third rubber composition having a tan $\delta 0$ value which is greater than the tan $\delta 0$ value of said at least one second rubber composition, the tan $\delta 0$ values being measured at a temperature of 0° C. and under a stress of 0.7 mPa.

According to a fifth advantageous embodiment, the difference between the tan $\delta 0$ value of said at least one first rubber composition and the tan $\delta 0$ value of said at least one second rubber composition is greater than or equal to 0.05.

According to a sixth advantageous embodiment, said at least one first rubber composition also has a tan $\delta 10$ value which is less than the tan $\delta 10$ value of said at least one second rubber composition, where tan $\delta 10$ denotes the tan $\delta$ value measured at a temperature of 10° C. and under a stress of 0.7 mPa.

Preferably, the difference between the tan $\delta 10$ value of said at least one first rubber composition and the tan $\delta 10$ value of said at least one second rubber composition is greater than or equal to 0.05.

Of course, it is possible, and even desirable, to combine two or more of the embodiments described.

BRIEF DESCRIPTION OF THE DRAWINGS

FIG. 3 depicts, in radial cross section, a quarter of a tire according to the prior art.

FIGS. 4 and 5 illustrate how the axial edge of a tread is determined.

FIG. 6 illustrates the terms "inner edge" and "outer edge" of a tread.

FIG. 7 schematically depicts the crown of a tire according to the prior art, in radial cross section.

DETAILED DESCRIPTION OF THE DRAWINGS

When using the term "radial", it is appropriate to make a distinction between various different uses that the person skilled in the art makes of this word. Firstly, the expression refers to a radius of the tire. It is in that sense that a point P1 is said to be "radially inside" a point P2 (or "radially on the inside of" the point P2) if it is closer to the axis of rotation of the tire than is the point P2. Conversely, a point P3 is said to be "radially outside" a point P4 (or "radially on the outside of" the point P4) if it is further from the axis of rotation of the tire than is the point P4. Progress "radially inwards (or outwards)" will mean progress towards smaller (or larger) radii. In terms of radial distances, it is this sense of the word that applies also.

By contrast, a thread or a reinforcement is said to be "radial" when the thread or the reinforcing elements of the reinforcement make an angle greater than or equal to 80° and less than or equal to 90° with the circumferential direction. Let us specify that, in this particular document, the term "thread" is to be understood in a very general sense of the word and encompasses threads in the form of monofilaments, multifilaments, a cord, a folded yarn or an equivalent assembly, irrespective of the material of which the thread is made or of the surface treatment it has undergone to encourage it to bond with the rubber.

Finally, a "radial cross section" or "radial section" here means a cross section or a section in a plane which contains the axis of rotation of the tire.

An "axial" direction is a direction parallel to the axis of rotation of the tire. A point P5 is said to be "axially inside" a point P6 (or "axially on the inside of" the point P6) if it is closer to the median plane of the tire than is the point P6. Conversely, a point P7 is said to be "axially outside" a point P8 (or "axially on the outside of" the point P8) if it is further from the median plane of the tire than is the point P8. The "median plane" of the tire is the plane which is perpendicular to the axis of rotation of the tire and which lies equal distances from the annular reinforcing structures of each bead.

A "circumferential" direction is a direction perpendicular both to a radius of the tire and to the axial direction. A "circumferential section" is a section in a plane perpendicular to the axis of rotation of the tire.

What is meant here by "tread surface" is all the points on the tread of a tire that are liable to come into contact with the ground when the tire is rolling.

The expression "rubber composition" denotes a rubber composition comprising at least one elastomer and one filler.

Figure 1:
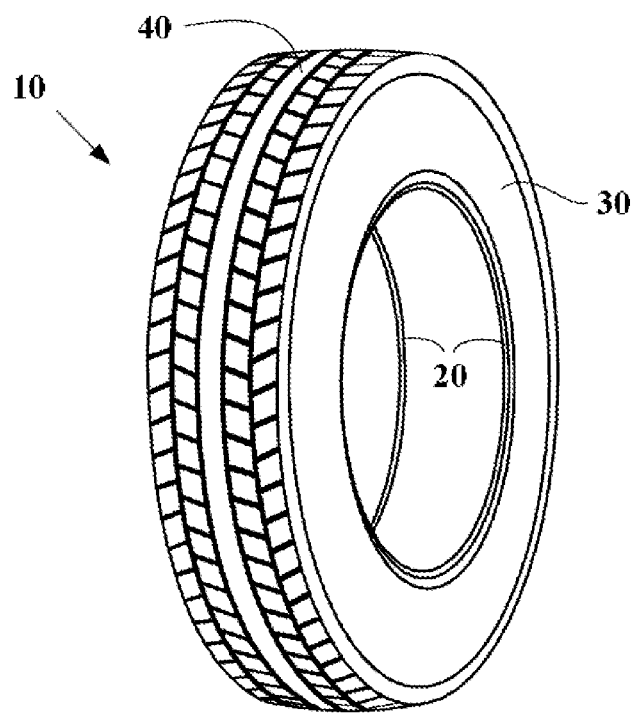
FIG. 1 depicts a tire according to the prior art.

FIG. 1 schematically depicts a tire 10 according to the prior art. The tire 10 comprises a crown comprising a crown reinforcement (not visible in FIG. 1) surmounted by a tread 40, two sidewalls 30 extending the crown radially inwards, and two beads 20 radially inside of the sidewalls 30.

Figure 2:
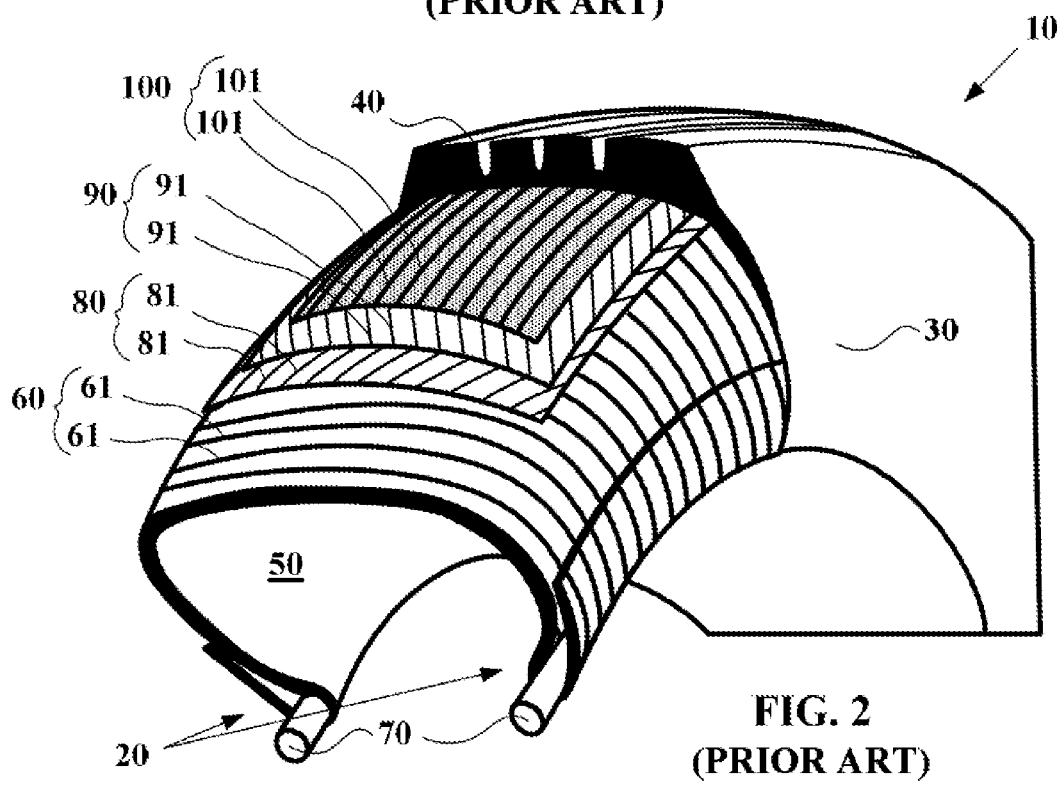
FIG. 2 depicts a partial perspective view of a tire according to the prior art.

FIG. 2 schematically depicts a partial perspective view of a tire 10 according to the prior art and illustrates the various components of the tire. The tire 10 comprises a carcass reinforcement 60 made up of threads 61 coated with rubber composition, and two beads 20 each comprising annular reinforcing structures 70 which hold the tire 10 on the rim (not depicted). The carcass reinforcement 60 is anchored in each of the beads 20. The tire 10 further comprises a crown reinforcement comprising two plies 80 and 90. Each of the plies 80 and 90 is reinforced with thread-like reinforcing elements 81 and 91 which are parallel within each layer and cross from one layer to the next, making angles ranging between 10° and 70° with the circumferential direction. The tire further comprises a hoop reinforcement 100, arranged radially on the outside of the crown reinforcement, this hoop reinforcement being formed of circumferentially directed spiral-wound reinforcing elements 101. A tread 40 is laid on the hoop reinforcement; it is this tread that provides contact between the tire 10 and the road. The tire 10 depicted is a "tubeless" tire: it comprises an "inner liner" 50 made of a rubber composition impervious to the inflation gas, covering the interior surface of the tire.

FIG. 3 schematically depicts, in radial cross section, one quarter of a reference tire 10 of the "Pilot Sport 2" type sold by Michelin. The tire 10 comprises two beads 20 intended to come into contact with a mounting rim (not depicted), each bead 20 comprising a plurality of annular reinforcing structures 70. Two sidewalls 30 extend the beads 20 radially outwards and meet in a crown 25 comprising a crown reinforcement formed of a first layer of reinforcing elements 80 and of a second layer of reinforcing elements 90, and radially surmounted by a hoop reinforcement 100, which is itself radially surmounted by a tread. The median plane of the tire is indicated by the reference 130.

The way in which the axial edges of a tread are determined is illustrated in FIGS. 4 and 5, each of which shows the profile of a semi-tread 41 and of that part of the sidewall that is adjacent to it. In some tire designs, the transition from tread to sidewall is very abrupt, as in the case depicted in FIG. 4, and determining the axial edge 45 of the semi-tread 41 is intuitive. However, there are tire designs in which the transition between tread and sidewall is continuous. An example is given in FIG. 5. The edge of the tread is then determined as follows. The tangent to the tread surface of the tire at any point on the tread surface in the region of transition between the tread and the sidewall is drawn, in a radial cross section of the tire. The axial edge is the point at which the angle $\alpha$ (alpha) between said tangent and an axial direction is equal to 30°. When there are several points at which the angle $\alpha$ (alpha) between said tangent and an axial direction is equal to 30°, it is the radially outermost point that is adopted. In the case of the tire depicted in FIG. 3, the axial edge 45 has been determined in this way.

Each layer of reinforcing elements 80 and 90 comprises thread-like reinforcing elements, coated in a matrix formed of rubber composition. The reinforcing elements of each layer are substantially mutually parallel; the reinforcing elements of the two layers cross from one layer to the next at an angle of about 20°, as is well known to those skilled in the art for tires known as radial tires.

The tire 10 further comprises a carcass reinforcement 60 which extends from the beads 20 through the sidewalls 30 as far as the crown 25. This carcass reinforcement 60 here comprises thread-like reinforcing elements that are directed substantially radially, that is to say that make an angle of greater than or equal to 80° and less than or equal to 90° with the circumferential direction.

The carcass reinforcement 60 comprises a plurality of carcass reinforcing elements; it is anchored in the two beads 20 between the annular reinforcing structures 70.

FIG. 7 schematically depicts the crown of a tire according to document WO 2011/076680 A1, intended to be mounted on a mounting rim of a wheel of a vehicle and having a predetermined direction of mounting on the vehicle. It comprises a tread that extends between an outer axial edge 45 and an inner axial edge 46, the inner axial edge being the edge intended to be mounted on the body side of the vehicle when the tire is mounted on the vehicle in said predetermined direction of mounting, such as is suggested in FIG. 6, which schematically depicts a vehicle 200. The tread surface is indicated by the reference 47.

The tread comprises three central ribs 411 to 413 and two side ribs 421 and 422 positioned on either side of the central ribs. The ribs are separated by circumferential grooves each comprising two side walls.

Figure 8:
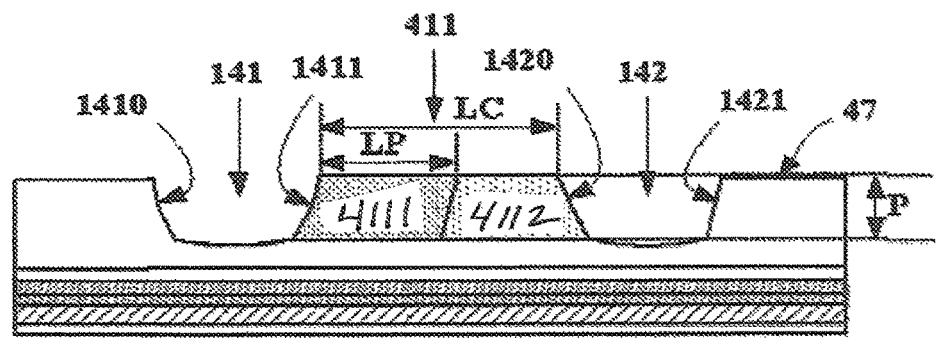
FIG. 8 illustrates the various quantities characterizing a central rib.
Figure 9:
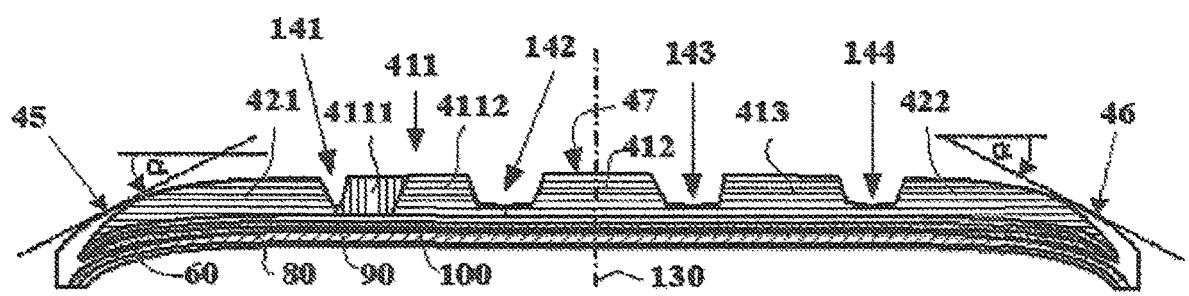
FIGS. 9 to 14 schematically depict the crown of a tire according to the invention, in radial cross section.

FIG. 8 illustrates the various quantities that characterize a central rib 411 (also shown in FIG. 9). This rib is delimited axially by an outer border and an inner border. The outer border is formed by the side wall 1411 of the circumferential groove 141; it is axially closer to the outer axial edge 45 (not represented) of the tread than the inner border. The inner border is formed by the side wall 1420 of the circumferential groove 142; it is axially closer to the inner axial edge 46 (not represented) of the tread than the outer border. The axial distance, over the tread surface 47 in the new state, between the outer border and the inner border defines the axial width LC of the central rib 411.

In the crown depicted in FIG. 7, the central rib 412 and the side rib 422 are made of a first rubber composition comprising an elastomer and at least one reinforcing filler, optionally including a carbon black, the carbon black representing a percentage of greater than or equal to 0% and less than or equal to 50% of the weight of all of the reinforcing filler.

On the other hand, the side rib 421 and the central ribs 411 and 413 are made of a second rubber composition comprising an elastomer and at least one reinforcing filler, including a carbon black, the carbon black representing a percentage of greater than or equal to 50% and less than or equal to 100% of the weight of all of the reinforcing filler.

The first rubber composition has a tan $\delta 0$ value which is greater than the tan $\delta 0$ value of the second rubber composition.

The central ribs 411 and 413 are entirely made from this second rubber composition; in other words, for each of these ribs, the portion made from this second rubber composition extends from the outer border of each central rib axially in the direction of the inner axial edge of the tread, the axial width of said portion being, over the entire radial depth of the central rib, equal to 100% of the axial width LC of the central rib.

Although this solution has made it possible to obtain an excellent compromise on dry ground and on wet ground, it remains perfectible in terms of grip on wet ground. Such an improvement is obtained with a tire according to the invention. FIGS. 9 to 14 represent embodiments of this tire.

The tire, the crown of which is depicted in FIG. 9, is intended to be mounted on a mounting rim of a wheel of a vehicle (not represented); it has a predetermined direction of mounting on the vehicle, and comprises a tread that extends between an outer axial edge 45 and an inner axial edge 46, the inner axial edge 46 being the edge intended to be mounted on the body side of the vehicle when the tire is mounted on the vehicle in said predetermined direction of mounting (see FIG. 6).

The tread comprises three central ribs 411 to 413 and two side ribs 421 and 422, the side ribs being positioned on either side of the central ribs. The ribs are separated by circumferential grooves 141 to 144 each comprising two side walls.

As was explained using FIG. 8, each central rib is delimited axially by an outer border and by an inner border, each border being formed by a side wall of a circumferential groove, the inner border being axially closer to the inner axial edge of the tread than the outer border, the axial distance, over the tread surface in the new state, between the outer border and the inner border defining the axial width LC of the central rib.

The side ribs 421 and 422 and also the central ribs 412 and 413 of the tire represented in FIG. 9 are entirely made from a first rubber composition comprising at least one elastomer and at least one reinforcing filler, optionally including a carbon black, the carbon black representing a percentage of greater than or equal to 0% and less than or equal to 50% of the weight of all of the reinforcing filler.

On the other hand, the central rib 411 comprises a portion 4112 made from the first rubber composition, and a portion 4111 made from the second rubber composition, this at least one second rubber composition comprising at least one elastomer and at least one reinforcing filler comprising a carbon black, the carbon black representing a percentage of greater than or equal to 50% and less than or equal to 100% of the weight of all of the reinforcing filler. This portion 4111 extends from the outer border of the central rib axially inwards, the axial width LP of said portion (see FIG. 8) being, over the entire radial depth of the central rib, of the order of 40% to 50% of the axial width LC of the central rib 411.

Once again, the first rubber composition has a tan $\delta 0$ value which is greater than the tan $\delta 0$ value of said at least one second rubber composition.

This tire according to the invention makes it possible to improve the grip of the reference tire on wet ground, while retaining its grip potential on dry ground. The applicant explains this surprising discovery in the following manner: in a tire according to the invention, unlike the reference tire, the outer side rib is made from a rubber composition that gives good grip on wet ground. This goes against the teaching of document WO 2011/076680, which teaches to make the outer rib from a rubber composition that gives good grip on dry ground, in order to benefit from the trapezoidal shape of the contact patch. However, during severe drift driving (i.e. under conditions encountered when driving round a circuit), a blistering phenomenon is observed over a significant part of the outer side rib, which means that the rubber composition that gives good grip on dry ground is not able to provide all the benefit expected at this location. By placing this rubber composition on the outer edge of one or more central ribs, both good grip on dry ground and protection of the central ribs against premature wear are obtained. The fact of placing a rubber composition that gives good grip on wet ground on the outer side rib proves to be profitable since the straight-line braking on wet ground is very significantly improved.

Figure 10:
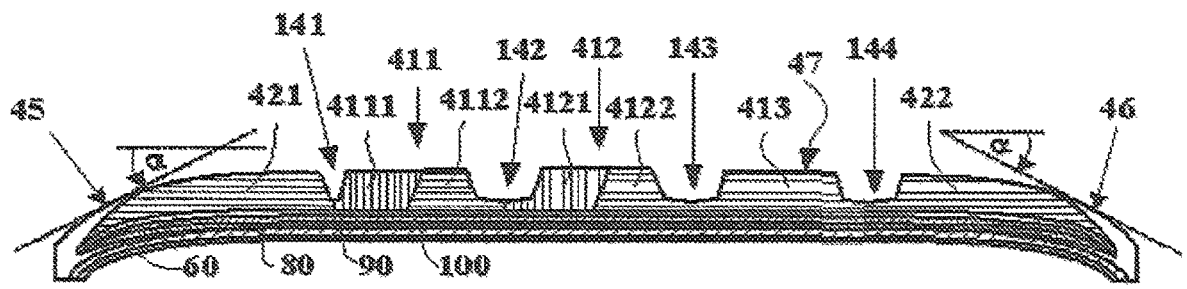

FIG. 10 schematically depicts the crown of another tire according to the invention. Unlike the tire depicted in FIG. 9, this tire comprises two central ribs 411 and 412 each comprising a portion made from the second rubber composition (portions 4111 and 4121, respectively), and a portion made from the first rubber composition (portions 4112 and 4122, respectively).

Figure 11:
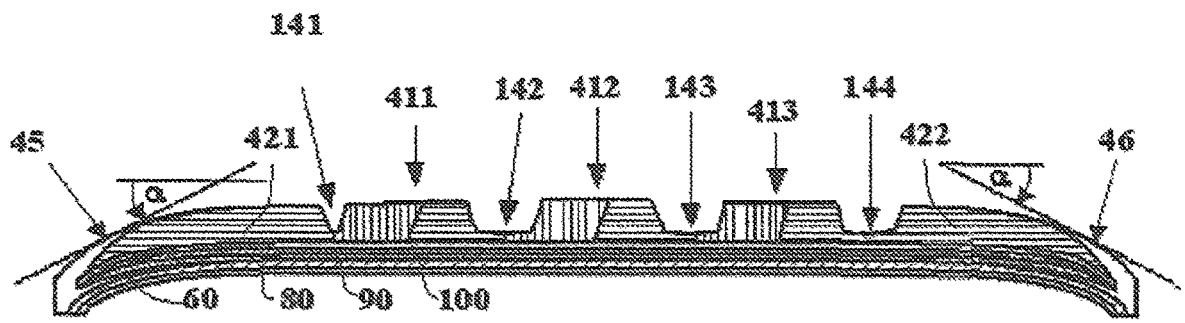

Of course, provision may also be made for all the central ribs 411 to 413 to comprise such a portion, as is the case for the tire according to the invention represented in FIG. 11.

In FIGS. 9 to 11, the portion made from the second rubber composition is found on the central ribs closest to the outer axial edge 45 since it is these central ribs that are more exposed to wear and the fact of providing the second rubber composition on these central ribs has the effect of protecting them against wear.

Nevertheless, this portion could absolutely be placed only on the central rib 413 or on the central ribs 412 and 413, etc. It is for the sake of conciseness that these embodiments, which are a priori less advantageous from the point of view of wear, have not been represented.

Figure 12:
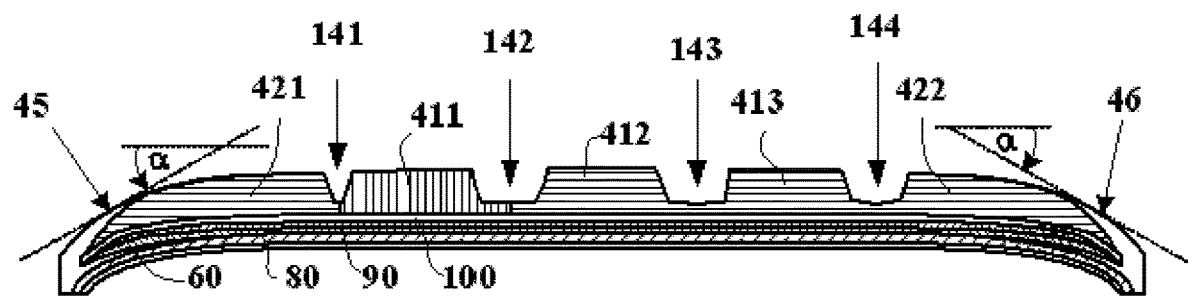
Figure 13:
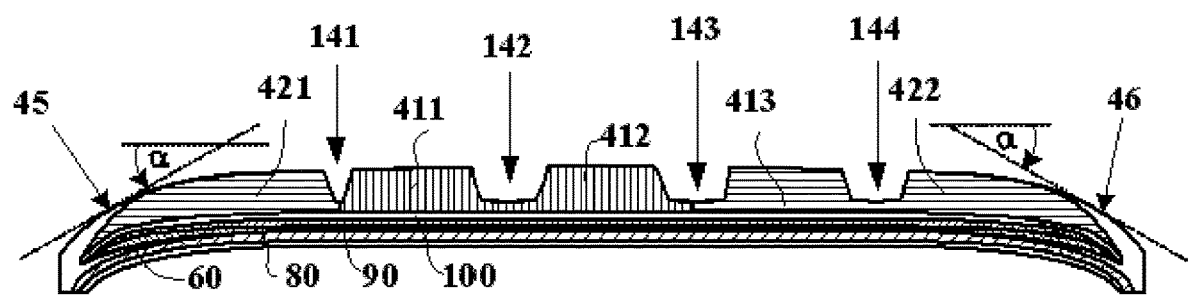
Figure 14:
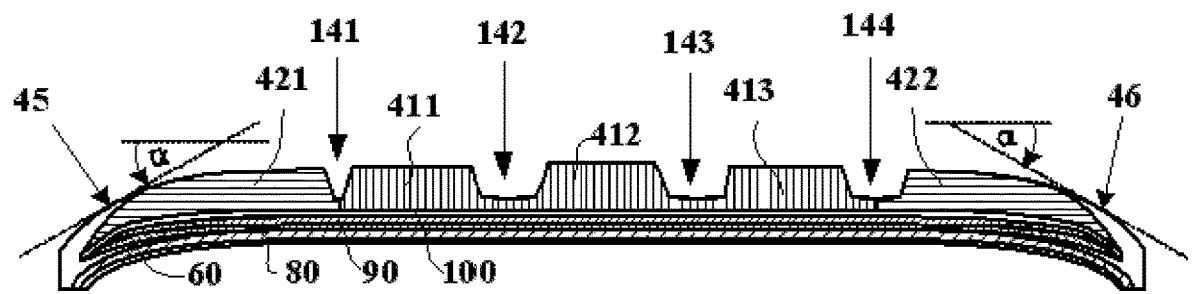

FIGS. 12 to 14 schematically depict three other embodiments of the tire according to the invention. Here, one (FIG. 12), two (FIG. 13) or even all of the central ribs (FIG. 14) are made entirely from the second rubber composition. Here too, it is not necessary for it to be the ribs closest to the outer axial edge that are affected, but for the sake of conciseness we have limited the number of embodiments represented. Similarly, a person skilled in the art will understand that it is possible to make provision for some of the central ribs of the tread to be made entirely from the second rubber composition and for others to be only partly made therefrom.

A person skilled in the art will also understand that the invention is in no way limited to a tire comprising three central ribs; it is absolutely possible to imagine embodiments comprising one, two or more than three central ribs.

Table 1 gives, by way of example, the composition of rubber compositions that can be used. The composition is given in phr ("parts per hundred of elastomer"), that is to say in parts by weight per 100 parts by weight of elastomer.

TABLE I

|  | First rubber composition | Second rubber composition |
|---|---|---|
| SBR Elastomer [1] | 100 | 100 |
| N 234 [2] | — | 100 |
| Silica | 100 | — |
| TESPT coupling agent (Degussa Si 69) | 8.0 | — |
| Plasticizer [3] | 50 | 50 |
| Anti-ozone wax C32 ST | 1.5 | 1.5 |
| Antioxidant (6PPD) [4] | 2.0 | 2.0 |
| Diphenylguanidine (DPG) | 1.7 | — |
| ZnO | 1.8 | 1.8 |
| Stearic acid | 2.0 | 2.0 |
| Sulphur | 1.3 | 1.3 |
| Accelerator (CBS) | 1.95 | 1.95 |

Notes for Table I:
[1] SSBR with 40% stirene, 48% 1,4-trans polybutadiene units
[2] Carbon black series 230 (ASTM)
[3] TDAE ("treated distillate aromatic extract") oil
[4] N-(1,3-dimethylbutyl)-N'-phenyl-p-phenylenediamine The rubber compositions are preferably based on at least one diene elastomer, a reinforcing filler and a crosslinking system.

What is meant by a "diene" elastomer (or interchangeably rubber) is, in the known way, an elastomer derived at least in part from (i.e. a homopolymer or a copolymer of) diene monomers, that is to say monomers bearing two carbon-carbon double bonds, conjugated or otherwise. The diene elastomer used is preferably selected from the group consisting of polybutadienes (BR), natural rubber (NR), synthetic polyisoprenes (IR), butadiene-stirene copolymers (SBR), isoprene-butadiene copolymers (BIR), isoprene-stirene copolymers (SIR), butadiene-stirene-isoprene copolymers (SBIR) and blends of these elastomers.

One preferred embodiment consists in using an "isoprene" elastomer, that is to say a homopolymer or copolymer of isoprene, in other words a diene elastomer selected from the group consisting of natural rubber (NR), synthetic polyisoprenes (IR), the various copolymers of isoprene and blends of these elastomers.

The isoprene elastomer is preferably natural rubber or a synthetic polyisoprene of the cis-1,4 type. Of these synthetic polyisoprenes, use is preferably made of polyisoprenes that have a cis-1,4 bond content (mol %) in excess of 90%, or more preferably still in excess of 98%. According to other preferred embodiments, the diene elastomer may consist, in full or in part, of another diene elastomer such as, for example, an SBR (E-SBR or S-SBR) elastomer used in combination or otherwise with another elastomer, for example of the BR type.

The rubber composition may also contain all or some of the additives conventionally employed in the rubber matrices intended for the manufacture of tires, such as, for example, reinforcing fillers such as carbon black or inorganic fillers such as silica, coupling agents for inorganic fillers, anti-ageing agents, antioxidants, plasticizing agents or extender oils, whether the latter are of aromatic or non-aromatic nature (notably oils that are only very slightly aromatic or non-aromatic, for example of the naphthenic or paraffinic type, with a high or preferably low viscosity, MES or TDAE oils, plasticizing resins with a high $T_g$ in excess of 30° C.), agents that improve the processability of the compositions in the uncured state, tackifying resins, a crosslinking system based either on sulphur or sulphur donors and/or peroxides, accelerators, vulcanization activators or retarders, anti-reversion agents, methylene acceptors and donors such as, for example, HMT (hexamethylenetetramine) or H3M (hexamethoxymethylmelamine), reinforcing resins (such as resorcinol or bismaleimide), known adhesion promoting systems of the metal salt type, for example, notably cobalt or nickel salts.

The second rubber composition contains at least one elastomer and at least one reinforcing filler comprising a carbon black, the carbon black representing a percentage PN1 greater than or equal to 50% and less than or equal to 100% of the weight of all of the reinforcing filler, and the first and third rubber compositions contain at least one elastomer and at least one reinforcing filler, optionally including a carbon black, the carbon black representing a percentage PN2 greater than or equal to 0% and less than or equal to 50% of the weight of all of the reinforcing filler.

The compositions are manufactured in appropriate mixers, using two successive phases of preparation well known to those skilled in the art: a first phase of thermomechanical work or kneading (the so-called "non-productive" phase) at high temperature, up to a maximum temperature of between 110° C. and 190° C., preferably between 130° C. and 180° C., followed by a second phase of mechanical work (the so-called "productive" phase) down to a lower temperature, typically of less than 110° C., during which finishing phase the crosslinking system is incorporated.

By way of example, the non-productive phase is conducted in a single thermomechanical step lasting a few minutes (for example between 2 and 10 min) during which all the necessary base constituents and other additives, apart from the crosslinking or vulcanizing system, are introduced into an appropriate mixer such as a conventional internal mixer. Once the mixture thus obtained has cooled, the vulcanizing system is then incorporated with it in an external mixer such as an open mill kept at a low temperature (for example between 30° C. and 100° C.). This is then blended (productive phase) for a few minutes (for example for between 5 and 15 min).

Vulcanizing (or curing) may be performed in the known way at a temperature generally between 130° C. and 200° C., preferably under pressure, for a sufficient length of time which may vary, for example, between 5 and 90 min depending in particular on the curing temperature, on the vulcanizing system adopted and on the vulcanization kinetics of the composition considered.

Table II gives the properties of the rubber compositions, the composition of which is given in Table I.

TABLE II

|  | First rubber composition | Second rubber composition |
|---|---|---|
| tan δ0, at 0.7 mPa | 0.88 | 0.76 |
| tan δ10, at 0.7 mPa | 0.58 | 0.69 |

These properties are measured with a viscosity analyser (Metravib VA4000), in accordance with standard ASTM D 5992-96. The response of a test specimen of vulcanized composition (a cylindrical test specimen with a thickness of 4 mm and a cross section of 400 mm$^2$) subjected to simple alternating sinusoidal shear stresses at a frequency of 10 Hz, during a temperature sweep between 0° and 100° C., under a fixed stress of 0.7 mPa, is recorded, particularly the value of tan δ observed at 0° C. and the values of tan δ observed at 10° C.

It will be recalled that, as is well known to those skilled in the art, the value of tan δ at 0° C. ("tan δ0") is representative of the grip potential on wet ground: the higher tan δ at 0° C., the better the grip. The values of tan δ at temperatures higher than 10° C. are representative of the hysteresis of the material and of the grip potential on dry ground.

To return to the mixtures the composition of which is given in Table I, it may be seen that the first rubber composition has a value of tan δ at 0° C. (imposed stress 0.7 mPa) that is higher by comparison with the second rubber composition, indicating that the grip on wet ground will be superior; and has a value of tan δ at 10° C. ("tan δ10") that is lower by comparison with the first composition, indicating that the grip on dry ground will be inferior.

Tests were carried out using a BMW 330i vehicle fitted with Pilot Super Sport tires, size 235/35 R19. A tire equipped with a tread as depicted in FIG. 9 was compared against a reference tire equipped with a tread as depicted in FIG. 7. The rubber compositions of Table I were used. The tires according to the invention made it possible to maintain the lap time (on the Charade circuit (France); circuit length: 4 km) on dry ground. The braking on wet ground, on the other hand, was significantly improved (by 3%), while there was no difference in braking on dry ground.

The invention claimed is:

1. A tire adapted to be mounted on a mounting rim of a wheel of a vehicle and having a predetermined direction of mounting on the vehicle, comprising a tread that extends between an outer axial edge and an inner axial edge, the inner axial edge being the edge intended to be mounted on the body side of the vehicle when the tire is mounted on the vehicle in said predetermined direction of mounting;
   wherein the tread comprises a plurality of central ribs and two side ribs, the side ribs being positioned on either side of said plurality of central ribs, the ribs being separated by circumferential grooves each comprising two side walls;
   wherein each central rib is delimited axially by an outer border and by an inner border, each border being formed by a side wall of a circumferential groove, the inner border being axially closer to the inner axial edge of the tread than the outer border, the axial distance, over the tread surface in the new state, between the outer border and the inner border defining the axial width (LC) of the central rib;
   wherein the side ribs are made entirely from a first rubber composition, this first rubber composition comprising at least one elastomer and at least one reinforcing filler, optionally including a carbon black, the carbon black representing a percentage of greater than or equal to 0% and less than or equal to 50% of the weight of all of the reinforcing filler;
   wherein at least an axially outermost one of the central ribs comprises a portion made from at least one second rubber composition, this at least one second rubber composition comprising at least one elastomer and at least one reinforcing filler comprising a carbon black, the carbon black representing a percentage of greater than or equal to 50% and less than or equal to 100% of the weight of all of the reinforcing filler, said portion extending from the outer border of at least the axially outermost central rib axially in the direction of the inner axial edge of the tread, the axial width of said portion being, over the entire radial depth of at least the axially outermost central rib, greater than or equal to 20% and less than or equal to 50% of the axial width LC of at least the axially outermost central rib; and
   wherein said first rubber composition has a tan δ0 value which is greater than the tan δ0 value of said at least one second rubber composition, where tan δ0 denotes the tan δ value measured at a temperature of 0° C. and under a stress of 0.7 mPa.

2. The tire according to claim 1, wherein the axially outermost central rib and at least one other of the central ribs comprise the portion made from said at least one second rubber composition.

3. The tire according to claim 1, wherein all of the central ribs comprise the portion made from said at least one second rubber composition.

4. The tire according to claim 1, wherein the axial width of said portion is, over the entire radial depth of at least the axially outermost central rib, less than or equal to 50% of the axial width LC of at least the axially outermost central rib, the remainder of at least the axially outermost central rib being composed of at least one third rubber composition, this at least one third rubber composition comprising at least one elastomer and at least one reinforcing filler, optionally including a carbon black, the carbon black representing a percentage of greater than or equal to 0% and less than or equal to 50% of the weight of all of the reinforcing filler, said at least one third rubber composition having a tan δ0 value which is greater than the tan δ0 value of said at least one second rubber composition.

5. The tire according to claim 1, wherein the difference between the tan δ0 value of said first rubber composition and the tan δ0 value of said at least one second rubber composition is greater than or equal to 0.05.

6. The tire according to claim 1, wherein said first rubber composition also has a tan δ10 value which is less than the tan δ10 value of said at least one second rubber composition, where tan δ10 denotes the tan δ value measured at a temperature of 10° C. and under a stress of 0.7 mPa.

7. The tire according to claim 6, wherein the difference between the tan δ10 value of said at least one second rubber composition and the tan δ10 value of said first rubber composition is greater than or equal to 0.05.

* * * * *